Dec. 24, 1935. A. Y. DODGE 2,025,224
METHOD OF SECURING LUBRICATION FITTINGS TO RECEIVING MEMBERS
Original Filed Sept. 17, 1931   2 Sheets-Sheet 1
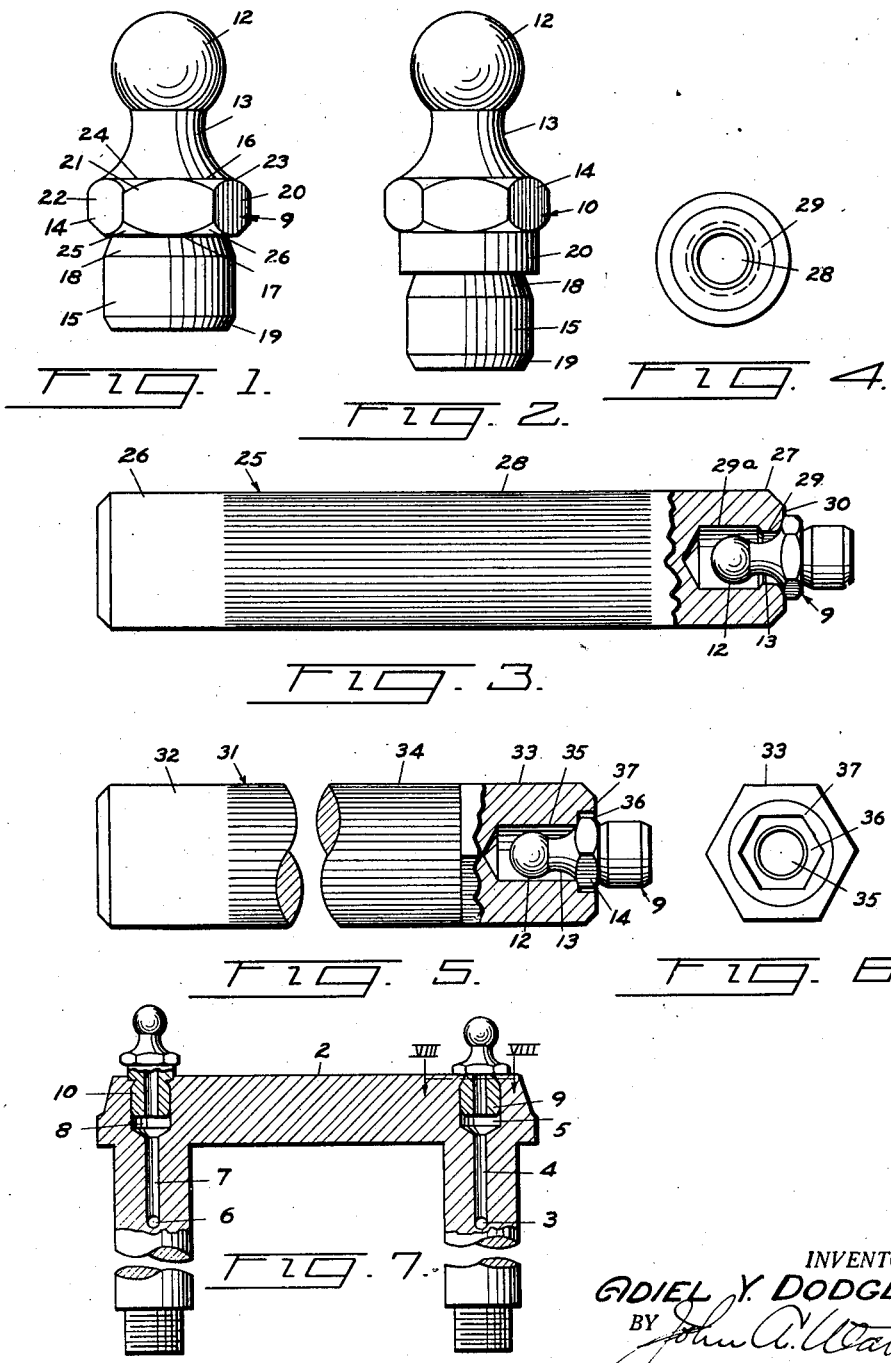
INVENTOR.
ADIEL Y. DODGE
BY
ATTORNEY Dec. 24, 1935.　　　　　A. Y. DODGE　　　　　2,025,224

METHOD OF SECURING LUBRICATION FITTINGS TO RECEIVING MEMBERS

Original Filed Sept. 17, 1931　　2 Sheets-Sheet 2

INVENTOR.
ADIEL Y. DODGE
BY
ATTORNEY

Patented Dec. 24, 1935

2,025,224

UNITED STATES PATENT OFFICE 2,025,224

METHOD OF SECURING LUBRICATION FITTINGS TO RECEIVING MEMBERS

Adiel Y. Dodge, South Bend, Ind., assignor to The Lubrication Corporation, South Bend, Ind., a corporation of Delaware Original application September 17, 1931, Serial No. 563,419, now Patent No. 1,996,795, dated April 9, 1935. Divided and this application July 21, 1933, Serial No. 681,427

4 Claims. (Cl. 29—88.2)

This invention relates to lubrication devices and more particularly to lubrication fittings and to methods of and means for securing and withdrawing the same and is a division of my copending application Serial #563,419, filed September 17th, 1931, and patented April 9, 1935, No. 1,996,795.

Prior to my invention, fittings provided for the purpose of feeding lubricant to bearings have usually been either screw fittings or friction type drive fittings. In securing a screw type fitting in proper association with the bearings to be lubricated, it is necessary that the fitting itself be threaded, that the bore into which the fitting is to be screwed be threaded or tapped, and that the fitting be screwed into the bore. All of these operations require considerable time and are relatively expensive.

In securing friction type drive fittings within bores, it is necessary that manufacturing tolerances be held down rigorously in order that a tight fit may be obtained. For instance in one common type of drive fitting the diameter of the bore into which the fitting is to be secured should be allowed a tolerance of no more than plus or minus 0.001 inch. As it is almost impossible to hold this tolerance by ordinary drilling the bore must be reamed after being drilled if a lubricant tight fit is to be assured. In spite of these precautions, friction type drive fittings cannot be used where high pressure lubrication is desired inasmuch as the high pressure sometimes built up under the fitting in lubrication bearings will blow the fitting from the bore, since it is merely held in place by slight frictional contact.

It is proposed in the corresponding application of John A. Watson, Serial #563,416, filed September 17th, 1931, assigned to the same assignee, to form lubrication fittings with square shouldered annular grooves and the like, and to lock the fittings in the receiving bores by driving or otherwise displacing metal from the bodies having the bores into the grooves by the use of a driving tool. However, I have discovered that excellent results as far as practical results are concerned, may be obtained, where the fitting is fairly strong, by using a shoulder of the fitting itself to displace the metal into the groove and furthermore that by a proper shaping of the groove and a selected shaping of the shoulder it is possible to withdraw the fitting from the bore with a relatively small expenditure of energy, also accomplishing, by the withdrawal, an ironing out of the bore so that it is in proper condition to receive, the same or a replacement fitting of the same type. With these improvements it is possible to reduce manufacturing and tool expense. By utilizing the fitting shoulder for displacing the metal, it is possible to decrease tool expense, and it is possible to decrease the force or energy required to drive and lock the fitting in the bore while by the shape of the shoulder it is possible to facilitate the replacement of fittings.

One of the primary objects of the invention is to provide an improved method whereby to secure drive fittings of the character disclosed in this application into a bore or the like in a bearing or the like.

Another object is to provide a method whereby such fittings as those disclosed in this application may be the more easily withdrawn from the bores into which they may be received.

Still other objects will become apparent after reading the following description and claims and after viewing the accompanying drawings in which:

Fig. 1 is a view in elevation showing a fitting constructed according to my invention;

Fig. 2 is a view in elevation showing a modified form of fitting;

Fig. 3 is a view partly in elevation and partly in section showing the fitting of Fig. 1 and a drive tool associated therewith;

Fig. 4 is a bottom plan view of the tool shown in Fig. 3;

Fig. 5 is a fragmentary view partly in elevation and partly in section showing the fitting of Fig. 1, and a different form of drive tool associated therewith;

Fig. 6 is a bottom plan view of the tool shown in Fig. 5;

Fig. 7 is a fragmentary view partly in section and partly in elevation showing a shackle bolt having a pair of fittings, similar to the fitting shown in Fig. 1 secured therein;

Figure 8:
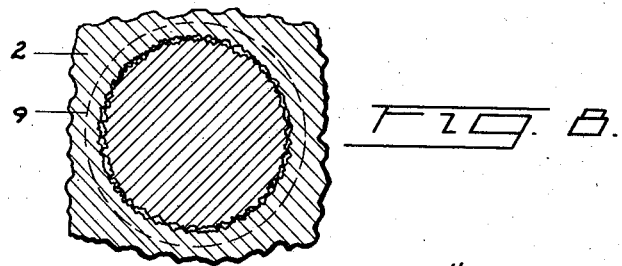
Fig. 8 is a fragmentary view in section taken substantially on the line VIII—VIII of Fig. 7, but shown on an enlarged and exaggerated scale.
Figure 10:
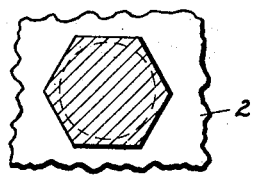
Fig. 10 is a view in section taken substantially on the line X—X of Fig. 9.
Figure 12:
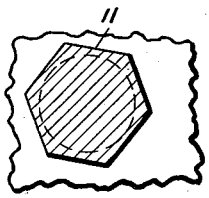
Fig. 12 is a view in section taken substantially on the line XII—XII of Fig. 11.

In general the drawings disclose a fitting having a ball head, a reduced neck, an enlarged wrench receiving portion and a generally cylindrical shank. The side of the wrench receiving portion adjacent to the head forms a drive receiving shoulder upon which a drive tool may be seated for forcing the fitting into a bore. The opposite side thereof forms a driving shoulder which contacts with the metal of the body in which the bore is formed and displaces the metal from the body into an annular groove formed in the shank portion of the fitting. The shank portion, moreover, is formed with a sloping drive starting shoulder by means of which the fitting may be initially positioned in the bore. The drive tool may extend only to contact with the top of the wrench receiving portion or may, in a preferred form, be provided with an extension or a plurality of extensions adapted to contact with the sides of the wrench receiving portion and thus support said portion of the fitting while the drive shoulder is displacing metal into the groove.

The extensions are also adapted to serve as a socket wrench for turning the fitting in the operation of withdrawing it from the bore for the purpose of replacing the fitting. The lower side or shank side of the wrench receiving portion (that is to say, the drive shoulder) is so shaped that upon rotation of the fitting in the withdrawing operation, the shoulder cams upon the body in which the fitting is secured and initiates the withdrawal of the fitting. Furthermore, by the rotation of the fitting and the withdrawal thereof, the interior of the bore is smoothed out and the locking projection is forced back into smooth relationship, with the side of the bore so that a new fitting may be easily substituted.

In Fig. 7 of the drawings a shackle bolt designated 2 is illustrated. This shackle bolt is provided with a plurality of bores 3, 4 and 5 and 6, 7 and 8. The bores 5 and 8 are enlarged relative to the other bores for the reception of lubrication fittings 9 and 10, respectively, which, in Figs. 1 and 2, are shown on a larger scale.

Referring particularly to Fig. 7 of the drawings, I have shown a shackle bolt 2 provided with a plurality of bores such as 3, 4, and 5, and 6, 7, and 8. In the bores 5 and 8 there are positioned lubricating fittings 9 and 10 which are shown on a larger scale in Figs. 1 and 2.

The fitting 9 of Fig. 1 is provided with a ball head 12, a reduced neck portion 13, an enlarged wrench receiving portion 14, and a cylindrical shank 15. The wrench receiving portion 14 is provided with an upper annular driving shoulder 16 and a lower annular driven shoulder 17. The shank 15, is adjacent to the wrench receiving portion 14, is formed with an annular groove 18, the lower side of which is slanted and is also provided with a slanted starting shoulder 19. The driven shoulder 17 is adapted to contact with the metal of the member into which the fitting is being driven and to displace part of the metal adjacent to the bore into the groove 18. To accomplish this purpose the ability of the shoulder to withstand strain should be approximately as good as the corresponding ability of the part into which the fitting is being driven. For example, the strength of the shoulder 14 should be at least nearly as great as the strength of the shackle 2. However, it is possible by reason of the greater lateral support given the shoulder 14 even to secure a softer fitting within a harder shackle.

The wrench receiving portion is flat sided having facets such as 20, 21 and 22 for receiving a wrench or other tool so that the fitting may be rotated. Each of the points formed between the facets preferably is beveled as at 23, 24, 25 and 26, and this construction as applied to the lower shoulder 17 is capable of accomplishing a novel function in the withdrawal of the fitting from the bore, as will be later more fully described.

The fitting 10 also is shown on an enlarged scale in Fig. 2 and inasmuch as many parts are exactly like corresponding parts of the fitting 9 they will be designated by like numerals and only unsimilar parts will be described in detail. The wrench receiving portion 10 in this form of fitting is not utilized directly for driving metal into the groove 18, but intermediate said portion 14 and said groove 18 there is provided a cylindrical shoulder portion 20 which is of smaller diameter than the portion 14, but of larger diameter than the diameter of the shank 15. Thus the lower shoulder of the portion 20 is adapted to contact with the metal adjacent to the bore into which the fitting is driven (e. g. the metal of the shackle 2) and drive this metal into the groove 18 to lock the fitting in the bore.

In Fig. 3, there is shown a tool 25 provided with a driven head 26, a driving head 27, and a knurled portion 28. The driving head 27 is formed with a central bore 29 adapted to receive the ball head 12 and the neck 13, and counterbored at 29a to insure against breaking the ball head of the fitting. The lower end of the head 27 is formed with an annular driving shoulder 30 which is adapted to contact with the shoulder 16 for driving the fitting into a bore.

In Figs. 5 and 6, there is shown a driving tool 31 formed with a driven head 32, a driving head 33, and a central knurled portion 34. The driving head 33 is formed with a central bore 35 for receiving the ball head 12 and neck portion 13 of the fitting 9. It is furthermore formed with a hexagon shaped recess 36 for receiving the wrench receiving portion 14 of the fitting 9. Thus the portion of the tool surrounding the recess 36 forms a projection 37 which is somewhat annular in shape and which contacts with the wrench receiving portion 14 and supports said wrench receiving portion while the fitting is being driven into the body provided with the bore and while it is being locked therein. Moreover, the recess 36 forms a socket wrench for holding the fitting and for aiding in turning it for withdrawal. As may be seen most clearly in Fig. 5 the exterior of the head 33 is also hexagon shaped and thus is capable of receiving a wrench so that the tool itself may be turned and thus may turn the fitting.

In the process of assembling a fitting such as 9 or 19 in a bore such as one of the bores 5 or 8, the starting shoulder 19 is first positioned within the entrance to the bore. Then a tool such as one of the tools 25 or 31 is positioned over the fitting and the driving shoulder of the tool (such as 29 or 37) is brought into contact with the drive shoulder 16 of the fitting. A blow or a plurality of blows with a hammer upon the head 26 or the head 32 forces the fitting into the bore. The lower side or driven shoulder 17 of the portion 14 contacts with the metal of the body 2 adjacent to the bore and displaces the metal downward and inward into the annular groove 18, thus locking the fitting within the bore. If the tool 31 is used, it is to be noted that the projection 37 surrounding the recess 36 supports and gives further strength to the portion 14 as the driven shoulder 17 operates to displace the metal. The metal displaced into the groove 18 may have an appearance under a microscope somewhat suggesting that shown in Fig. 8, but the showing of Fig. 8 is very much exaggerated inasmuch as the joint between the two metals appears quite even to the naked eye. It may be said that by reason of the fact that one side of the groove is slanted, the metal flows uniformly into the groove and locks the fitting firmly within the bore.

Figure 9:
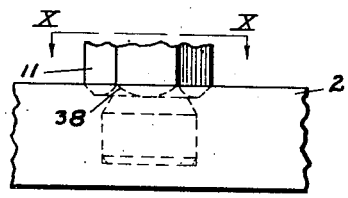
Fig. 9 is a fragmentary view in elevation showing on an enlarged scale the fitting of Fig. 1 inserted in a bore.
Figure 11:
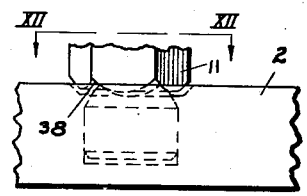
Fig. 11 is a view similar to Fig. 9 showing the fitting rotated and partially loosened from the bore.
Figure 14:
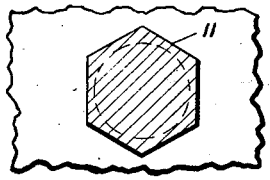
Fig. 14 is a view in section taken substantially on the line XIV—XIV of Fig. 13.
Figure 16:
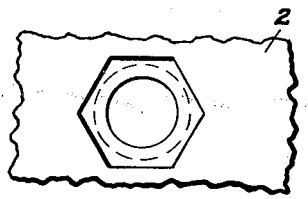
Fig. 16 is a view in top plan of the body shown in Fig. 15.
Figure 13:
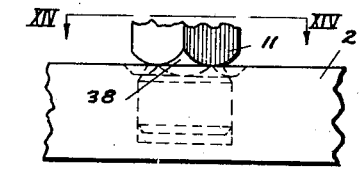
Fig. 13 is a view similar to Figs. 9 and 11 showing the fitting further loosened in the bore.
Figure 15:
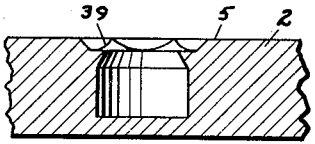
Fig. 15 is a view in vertical section showing the bore as it would appear if the fitting were removed therefrom without displacing the metal of the bore from the position which it occupies when the fitting is in the bore.

In the process of withdrawing a fitting such as the fitting 9 from the bore 5, a tool such as the tool 31 is positioned over the fitting so that the projections 37 and the recess 36 embrace the wrench receiving portion. Thereafter, a wrench is placed on the hexagonal outer surface of the head 33 and by rotation of the wrench and the tool, the fitting 9 is turned from the position shown in Fig. 9 to the position shown in Fig. 11, and then to the position shown in Fig. 13, which causes the lower cam shaped surface of the shoulder 17 to ride up upon the irregular surface 39 of the metal adjacent to the bore 5, thus causing the fitting to start to move out of the bore. In its movement out of the bore the slanting side of the groove 18 forces the metal which had been previously forced into the groove out of the groove back toward its original position, thus smoothing out the sides of the bore. Moreover, the rotation of the fitting in the bore tends to ream out the bore and smooths out the irregularities shown in Fig. 8 so that a new fitting may be easily inserted to replace the one being withdrawn.

By way of example and not by way of limitation, I will set out below dimensions in inches and angles in degrees which have been found to be most satisfactory for one size of my improved drive type fitting. The ball head 12 of the fitting is formed with a radius of substantially 0.250" and the wrench receiving portion 14 is formed from 0.344" hexagon steel stock. The cylindrical portion 15 has a diameter of 0.317", a tolerance of plus or minus 0.001" being allowed. The width of the annular groove 18 is 0.046", and the depth of the groove is 0.0195", the slope of the slanting shoulder thus approximating 23 degrees. The slanted shoulder 19 has a length of 0.031", while the smallest diameter of the groove is 0.278", a tolerance of plus or minus 0.002" being allowed. With a fitting of this construction, a bore in the receiving part may have a diameter varying from 0.310" to 0.317" and the bore need not be reamed.

In a friction type drive fitting having comparable dimensions and constructed according to the usual practice, the cylindrical portion of the fitting corresponding to the portion 15 has a diameter of about 0.317", a tolerance of about plus or minus 0.0005" being allowed. The bore is drilled with a diameter of 0.3125", and a tolerance of only plus or minus 0.001" is allowed. Moreover, after the drilling operation is completed it is necessary in the friction type drive fitting under consideration to ream the bore so as to attempt to secure a lubricant tight fitting.

In spite of all of these precautions, it has been found that the ordinary drive fittings described blow out under very low lubricant pressures, whereas a fitting constructed as described above will withstand more than 10,000 pounds pressure without blowing out or leaking.

Thus I have provided a lubrication fitting which is relatively inexpensive to make, which requires only an inexpensive drilling operation in forming a bore for its reception, which allows relatively large tolerances in the drilling operation and which may be relatively inexpensively secured within the bore. Moreover, the fitting provided will be securely held within the bore and will not be blown out by high lubricant pressures. The fitting provided not only can be easily secured in lubricant tight relationship, but also can be easily removed, leaving the bore in proper condition to receive a new or replacement fitting.

It is to be understood that the above embodiments of the invention are for the purpose of illustration only, and various changes may be made therein without departing from the spirit and scope of the invention.

I claim:

1. The method of securing a lubrication fitting within a bore formed in a metal body comprising, forming a portion of the fitting that is to be received in the bore with a shoulder having a surface adapted to face outwardly of the bore, inserting the said fitting portion within said bore, and causing another portion of the fitting that is disposed outwardly of the bore relative to the first said portion to contact with said metal body and to displace metal of said body over and into the direct path of egress of said shoulder from said bore, the displaced metal preventing said fitting from being ejected from said bore through pressure exerted in a direction parallel to the axis of the bore.

2. The method of securing a lubrication fitting within a bore in a metal body comprising, driving into said bore a fitting provided with a lubricant receiving channel adapted to receive a lubricant under pressure and having a surface which is subjected to the pressure of the lubricant acting axially of the bore against said surface and tending to displace said fitting from the bore, said fitting also being provided with an external preformed depression finally to be located within the bore, said depression being defined by substantially opposed shoulders, and, through force applied to a portion of the fitting outside of said bore, causing one of said shoulders to flow metal from said body into said depression to retain the fitting in the bore against the action of lubricant pressure upon said surface.

3. The method of securing a lubrication fitting within a bore in a metal body comprising, providing a fitting having a surface which is subjected to the pressure of the lubricant acting substantially axially of the fitting and an external shoulder substantially facing away from the end of the fitting which is to be disposed in the bore, entering the said end of the fitting into said bore, and, through force applied to a portion of the fitting which is outside of the bore, causing a portion of the fitting to displace metal of the body into the path of direct egress of said shoulder from the bore under the influence of pressure on said surface and tending to urge the fitting from the bore.

4. The method of securing a lubrication fitting within a bore formed in a metal body comprising, driving into said bore a fitting having an inwardly facing surface adapted to be exposed to the pressure of the fluid within the bore, said fitting also having a pre-formed surface facing substantially outward of the bore and to be located within the limits of the bore, and continuing said driving while causing a portion of the fitting to engage with and to flow metal from said body into said bore and over said outwardly facing surface, said flowed metal remaining substantially integral with said body and preventing direct displacement of the fitting from the bore under the influence of pressure of fluid within the bore exerted against said inwardly facing surface.

ADIEL Y. DODGE.